(12) United States Patent
Kuo (10) Patent No.: US 9,341,796 B2
(45) Date of Patent: May 17, 2016

(54) OPTICAL COUPLER AND PHOTOELECTRIC CONVERSION DEVICE HAVING SAME

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/325,548

(22) Filed: Jul. 8, 2014

(65) Prior Publication Data

US 2015/0331211 A1 Nov. 19, 2015

(30) Foreign Application Priority Data

Jul. 9, 2013 (TW) .............................. 102124456 A (51) Int. Cl.
*G02B 6/12* (2006.01)
*G02B 6/43* (2006.01)
*G02B 6/42* (2006.01)
*G02B 6/32* (2006.01)

(52) U.S. Cl.
CPC .. *G02B 6/43* (2013.01); *G02B 6/32* (2013.01); *G02B 6/428* (2013.01); *G02B 6/4214* (2013.01); *G02B 6/4257* (2013.01); *G02B 6/4295* (2013.01)

(58) Field of Classification Search
CPC ..... G02B 6/4214; G02B 6/4204; G02B 6/124
USPC .......................... 385/14, 33, 31, 36, 39, 88, 93
See application file for complete search history.

(56) References Cited

U.S. PATENT DOCUMENTS

| 8,873,907 | B2* | 10/2014 | Kuo ..................... | G02B 6/4214 385/33 |
| 8,942,525 | B2* | 1/2015 | Kuo ..................... | G02B 6/43 385/33 |
| 2005/0175347 | A1* | 8/2005 | Ray ..................... | G02B 6/4214 398/88 |
| 2006/0239605 | A1* | 10/2006 | Palen ................... | G02B 6/4206 385/14 |
| 2012/0263416 | A1* | 10/2012 | Morioka ............... | G02B 6/4214 385/33 |
| 2014/0079352 | A1* | 3/2014 | Lin ...................... | G02B 6/4286 385/14 |
| 2015/0071593 | A1* | 3/2015 | Kanke .................. | G02B 6/4286 385/89 |

* cited by examiner

*Primary Examiner* — Ellen Kim
(74) *Attorney, Agent, or Firm* — Novak Druce Connolly Bove + Quigg LLP (57) ABSTRACT

A photoelectric conversion device uses an optical coupler to divide a light beam emitted from a light emitter into two portions according to a predetermined ratio. A first light beam portion is guided to an optical fiber, and a second light beam portion is guided to a light receiver. The light receiver can detect an intensity of the second light beam portion. In this way, a processor can calculate an intensity of the light beam emitted from the light emitter accordingly.

18 Claims, 6 Drawing Sheets

OPTICAL COUPLER AND PHOTOELECTRIC CONVERSION DEVICE HAVING SAME

FIELD

The present disclosure relates to optical communication systems, and particularly to an optical coupler and a photoelectric conversion device having the optical coupler.

BACKGROUND

Optical couplers are used in photoelectric conversion devices. Optical couplers are normally configured to couple a light beam emitted from a light emitter to an optical fiber.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a number of" mean "at least two." The references "outside" refer to a region that is beyond the outermost confines of a physical object. The references "substantially" are defined to be essentially conforming to the particular dimension, shape or other word that substantially modifies, such that the component need not be exact. The references "comprising," when utilized, mean "including, but not necessarily limited to"; it specifically indicates open-ended inclusion or membership in the so-described combination, group, series and the like.

Figure 1:
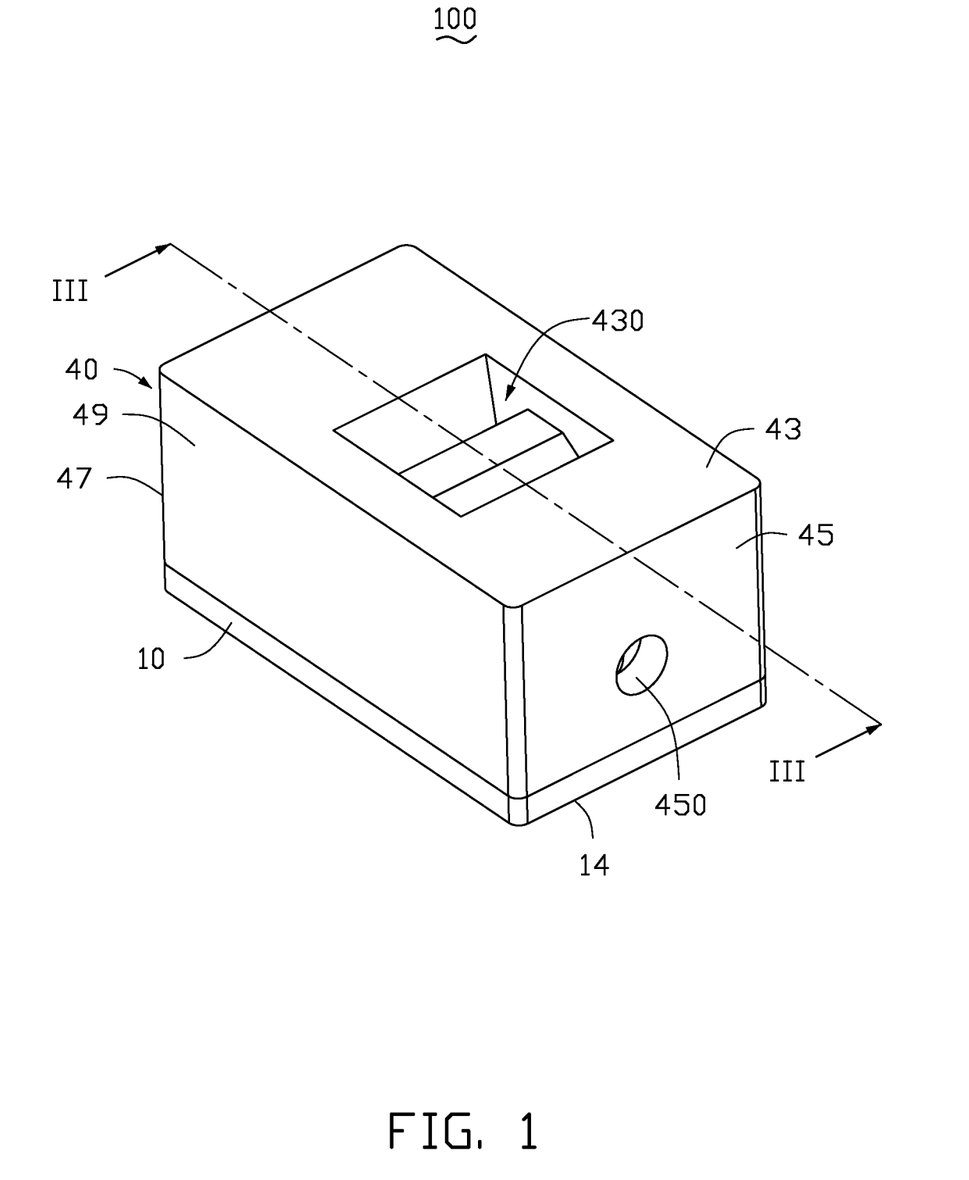
FIG. 1 is an isometric view of a first embodiment of a photoelectric conversion device of the present disclosure.
Figure 2:
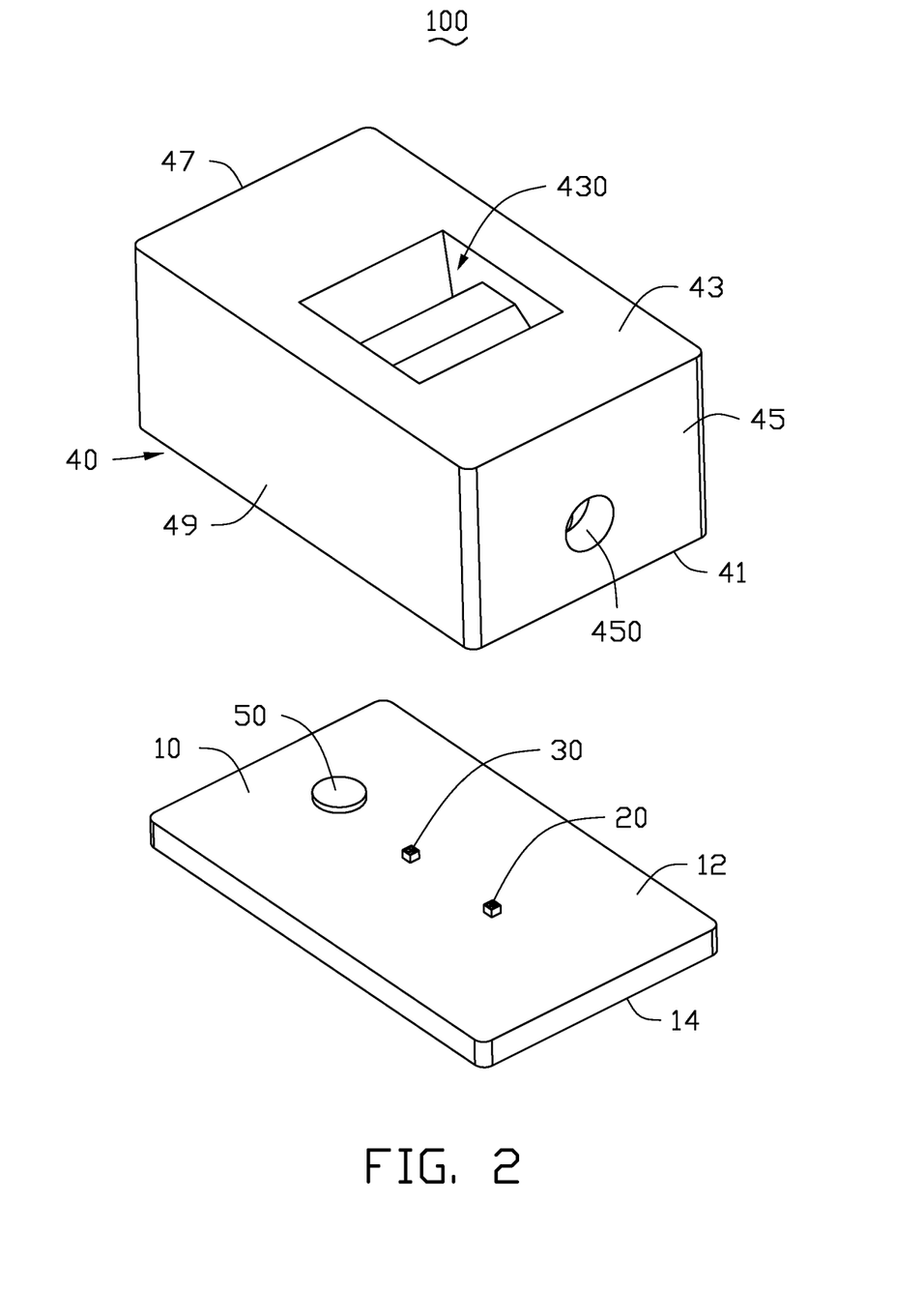
FIG. 2 is an exploded view of the photoelectric conversion device of FIG. 1.

FIG. 1 illustrates a first embodiment of a photoelectric conversion device 100. FIG. 2 illustrates an exploded view of the photoelectric conversion device 100 of FIG. 1. The photoelectric conversion device 100 includes a circuit board 10 and an optical coupler 40. A light emitter 20, a light receiver 30, and a processor 50 are located on the circuit board 10.

The circuit board 10 includes an upper surface 12, and a lower surface 14 opposite to the upper surface 12. In at least one embodiment, the upper surface 12 and the lower surface 14 are substantially parallel to each other.

The light emitter 20 and the light receiver 30 are located on the upper surface 12 and electrically connected to the circuit board 10. The light emitter 20 and the light receiver 30 are spaced from each other. The light emitter 20 converts electrical signals into optical signals, and emits light beams carrying the optical signals. The light receiver 30 receives light beams and detects an intensity of the received light beams. In at least one embodiment, the light emitter 20 is a vertical cavity surface emitting laser (VCSEL).

The optical coupler 40 includes a main body 49 being substantially cuboid in shape with a bottom surface 41, a top surface 43 opposite to the bottom surface 41, a front surface 45, and a back surface 47 opposite to the front surface 45. The bottom surface 41 and the top surface 43 are substantially parallel to each other, and the front surface 45 and the back surface 47 are substantially parallel to each other. The front surface 45 and the back surface 47 are connected substantially perpendicular to the bottom surface 41 and the top surface 43. In at least one embodiment, the main body 49 is made of polyether imide resin having a refractive index of about 1.663.

Figure 3:
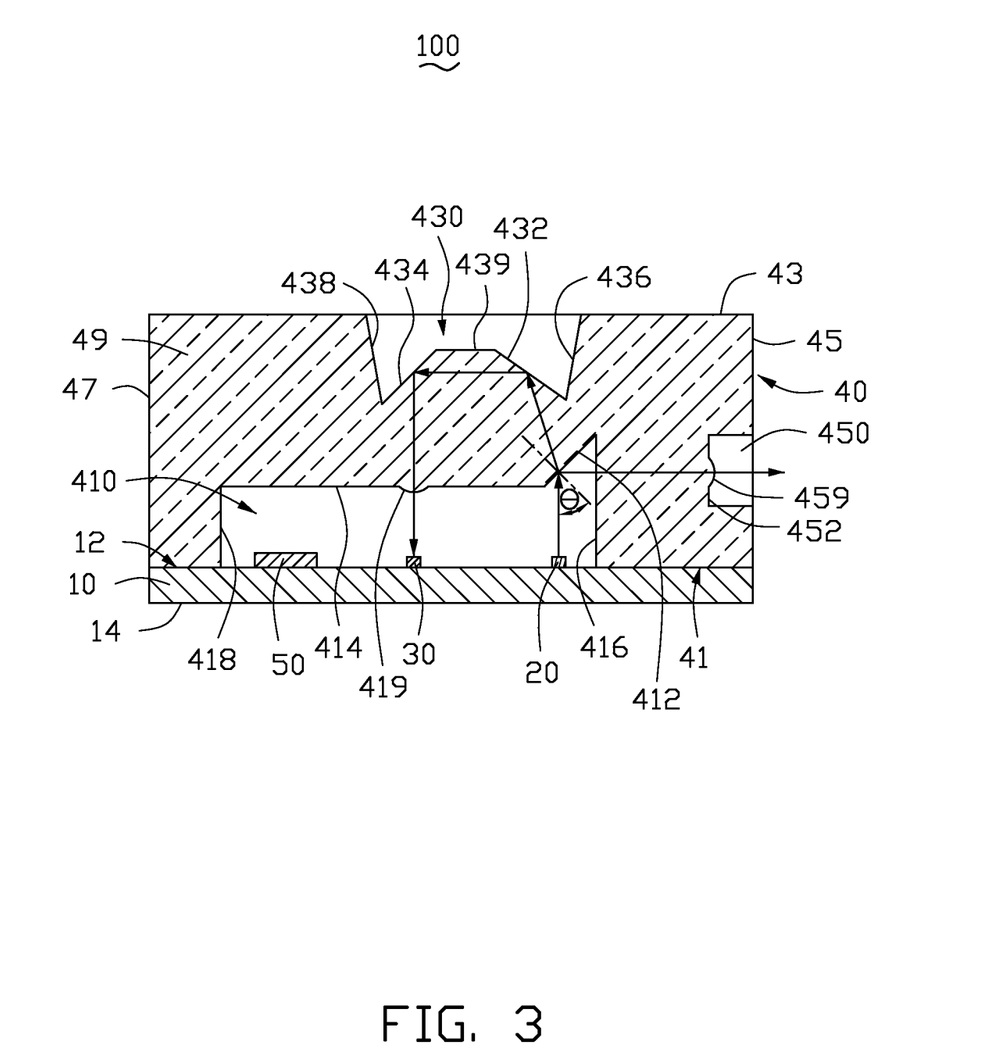
FIG. 3 is a cross-sectional view of the photoelectric conversion device of FIG. 1, taken along line III-III.

FIG. 3 illustrates a cross-sectional view of the photoelectric conversion device of FIG. 1, taken along line III-III. The main body 49 defines a bottom groove 410 in the bottom surface 41. The bottom groove 410 includes a first surface 412, a second surface 414, a first sidewall 416, and a second sidewall 418. In at least one embodiment, the first surface 412 and the second surface 414 are connected to each other between the first sidewall 416 and the second sidewall 418, and the second surface 414 is substantially parallel to the bottom surface 41. The first surface 412 is connected to the second surface 414 at about a 135 degree angle, and connected to the first sidewall 416 at about a 45 degree angle. The first sidewall 416 is substantially perpendicular to the bottom surface 41. The second surface 414 is connected substantially perpendicular to the second sidewall 418. In at least one embodiment, the optical coupler 40 includes a first convergent lens 419 located on the second surface 414. An optical axis of the first convergent lens 419 is substantially perpendicular to the second surface 414. In at least one embodiment, the first convergent lens 419 is a convex lens.

The main body 49 defines a top groove 430 in the top surface 43. The top groove 430 includes a third surface 432, a fourth surface 434, a third sidewall 436, a fourth sidewall 438, and a connecting surface 439. The connecting surface 439 is connected between the third surface 432 and the fourth surface 434. The third surface 432 is connected to the third sidewall 436, and the fourth surface 434 is connected to the fourth sidewall 438. The third surface 432 and the fourth surface 434 are both inclined relative to the top surface 43. The optical axis of the first convergent lens 419 crosses the fourth surface 434. The connecting surface 439 is substantially parallel to the top surface 43. The third sidewall 436 is connected between the third surface 432 and the top surface 43. The fourth sidewall 438 is connected between the fourth surface 434 and the top surface 43. In at least one embodiment, an angle between the third surface 432 and the top surface 43 is about [22.5+(arcsin0.425)/2] degrees, and an angle between the fourth surface 434 and the top surface 43 is about 45 degrees.

The main body 49 defines a front groove 450 in the front surface 45. The front groove 450 includes a fifth surface 452. The fifth surface 452 is substantially parallel to the front surface 45. In at least one embodiment, the optical coupler 40 includes a second convergent lens 459 located on the fifth surface 452. An optical axis of the second convergent lens 459 is substantially perpendicular to the fifth surface 452. The optical axis of the second convergent lens 459 crosses the first surface 412. In at least one embodiment, the second convergent lens 459 is a convex lens. In other embodiments, the front groove may not be defined in the front surface, that is, the second convergent lens can be directly positioned on the front surface.

In assembly, the optical coupler 40 is positioned on the upper surface 12 of the circuit board 10, such that the bottom surface 41 contacts the upper surface 12. The light emitter 20, the light receiver 30, and the processor 50 are received in the bottom groove 410. The processor 50 is electrically connected to the circuit board 10, the light emitter 20, and the light receiver 30. The light emitter 20 can emit light toward the first surface 412. The light receiver 30 is optically aligned with the first convergent lens 419 along the optical axis of the first convergent lens 419.

In operation, the circuit board 10 sends electrical signals to the light emitter 20. The light emitter 20 converts the electrical signals into optical signals, and emits a light beam carrying the optical signals. The light beam emitted from the light emitter 20 toward the first surface 412. An incident angle θ between the light beam and the first surface 412 is about 45 degrees. The light beam is divided into a first light beam portion and a second light beam portion according to a predetermined ratio. The first light beam portion is reflected by the first surface 412, and the second light beam portion is refracted by the first surface 412. The first light beam portion passes through the first sidewall 416 and projects onto the second convergent lens 459. The second convergent lens 459 can converge the first light beam portion onto an optical fiber (not shown). The second light beam portion is refracted by the first surface 412 and projects onto the third surface 432. The third surface 432 reflects the second light beam portion onto the fourth surface 434, and then the fourth surface 434 reflects the second light beam portion onto the first convergent lens 419. The first convergent lens 419 converges the second light beam portion onto the light receiver 30. The light receiver 30 detects an intensity of the second light beam portion. Because the second light beam portion is substantially completely reflected and projected on the light receiver 30, the processor 50 can calculate a total intensity of the light beam emitted from the light emitter 20 according to the predetermined ratio between the first light beam portion and the second light beam portion.

In other embodiments, the angle between the third surface 432 and the top surface 43 can be changed, and the angle between the fourth surface 434 and the top surface 43 can be changed, as long as the second light beam portion can be entirely reflected by the third surface 432 and the fourth surface 434. The connecting surface 439 can also be omitted, such that the third surface 432 is directly connected to the fourth surface 434, as long as the second light beam portion can be entirely reflected by the third surface 432 and the fourth surface 434.

Figure 4:
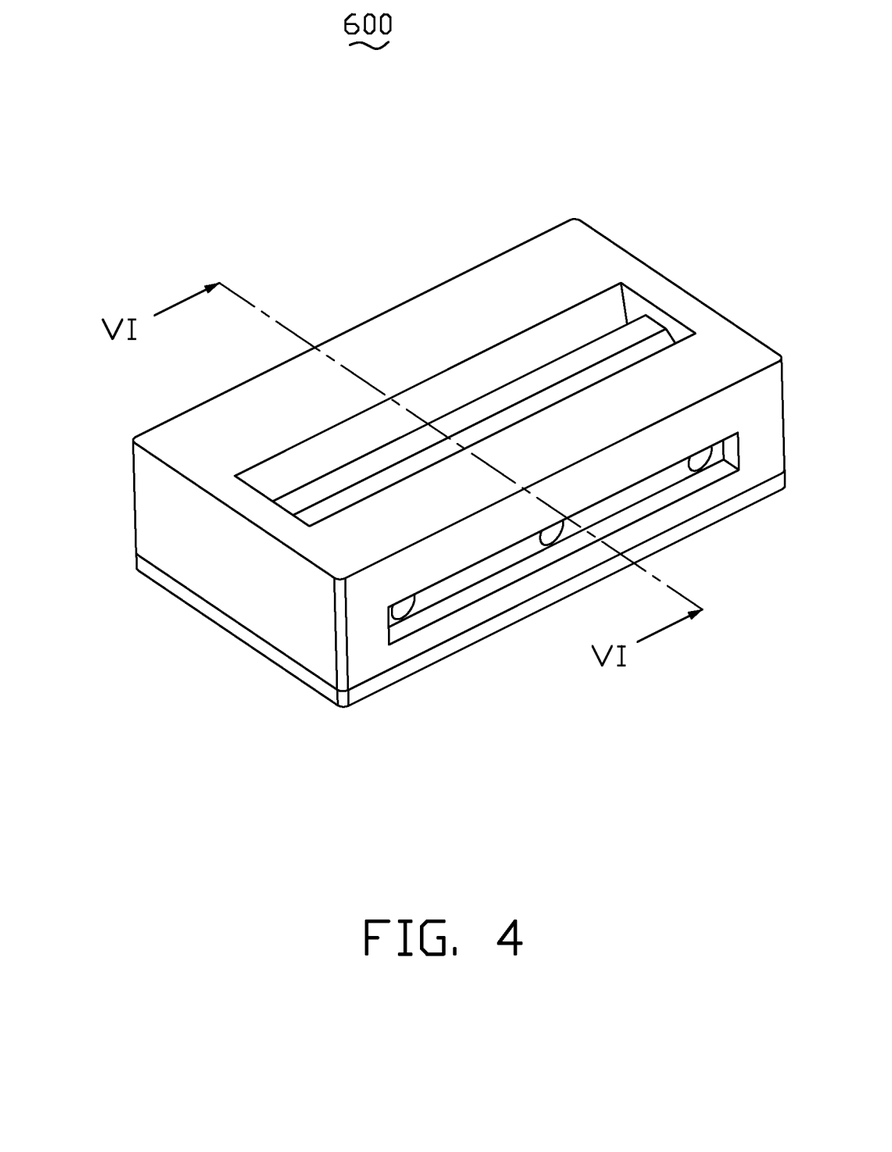
FIG. 4 is an isometric view of a second embodiment of a photoelectric conversion device of the present disclosure.
Figure 5:
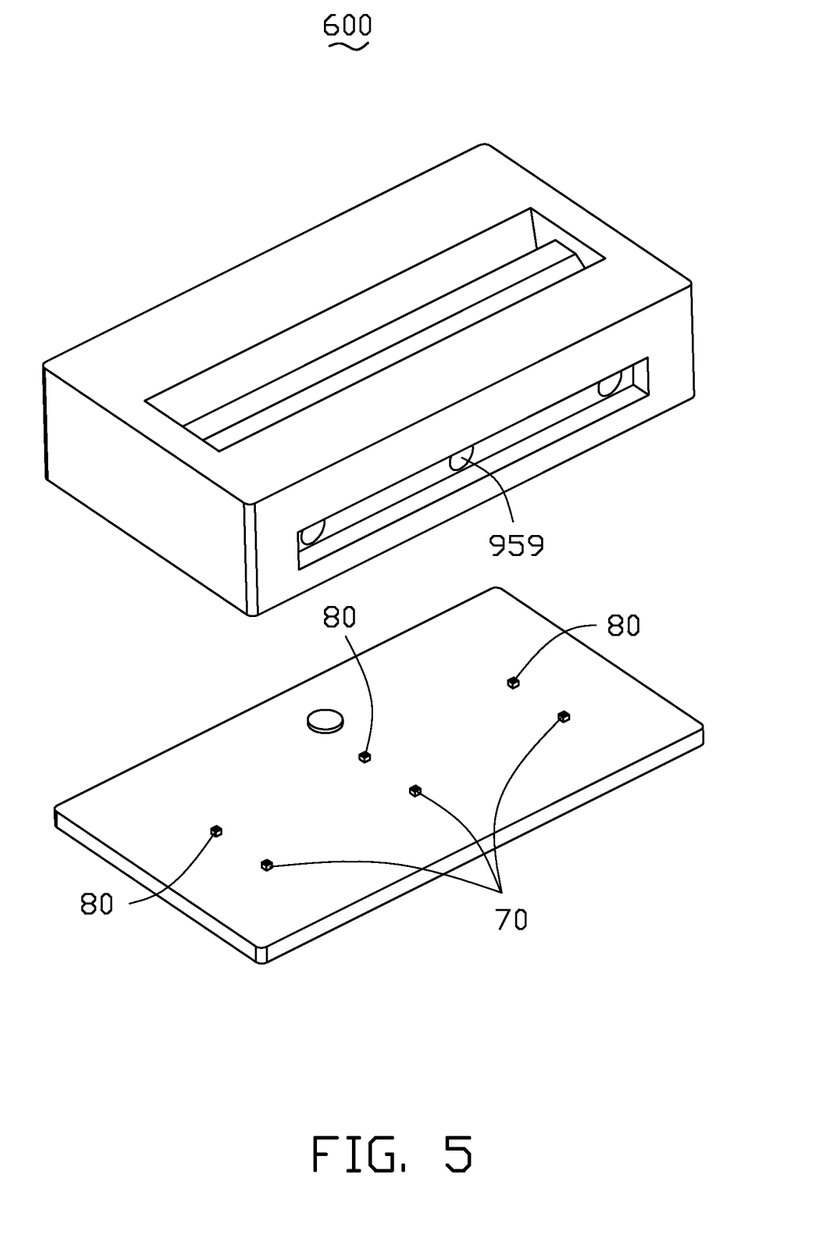
FIG. 5 is an exploded view of the photoelectric conversion device of FIG. 4.
Figure 6:
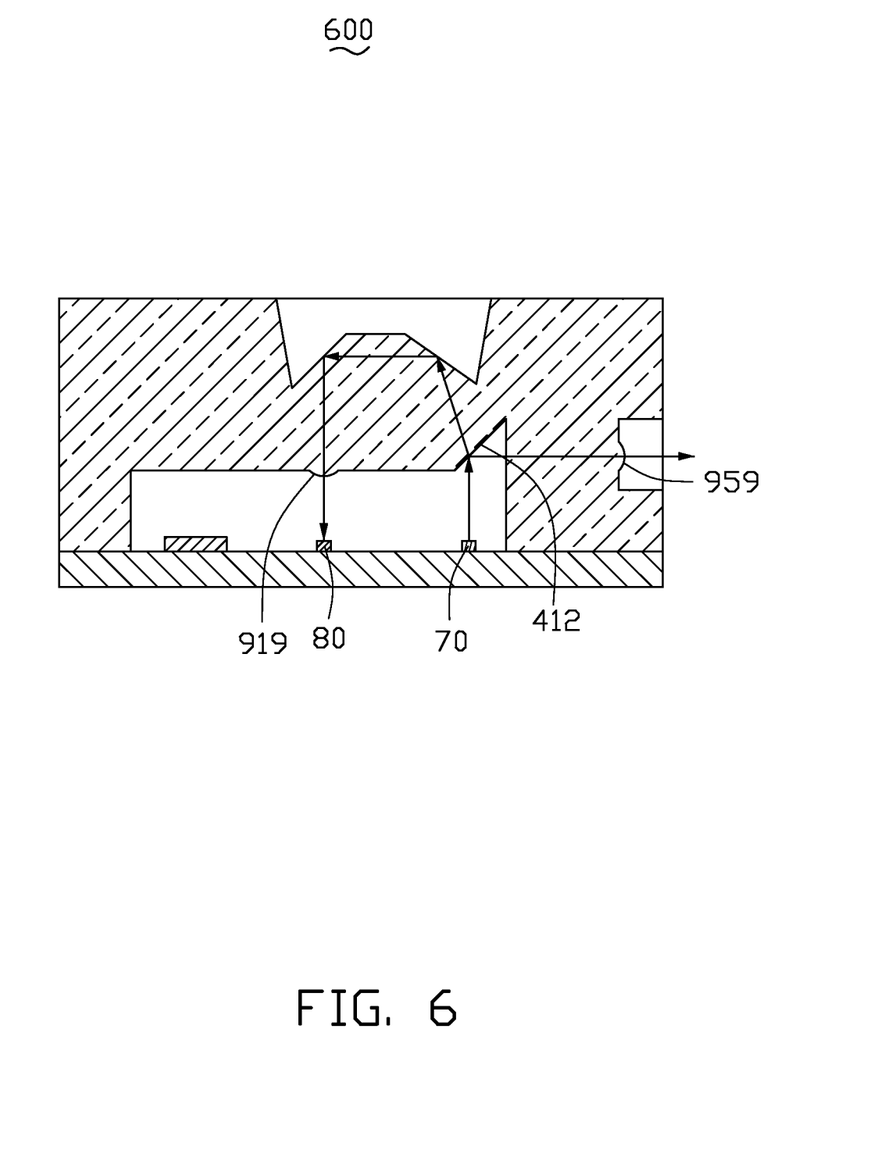
FIG. 6 is a cross-sectional view of the photoelectric conversion device of FIG. 4, taken along line VI-VI.

FIGS. 4-6 illustrate a second embodiment of a photoelectric conversion device 600. The photoelectric conversion device 600 is substantially the same as the photoelectric conversion device 100, except that the photoelectric conversion device 600 includes a number of light emitters 70, a number of light receivers 80, a number of first convergent lenses 919 and a number of second convergent lenses 959. The numbers of the first convergent lenses 919, the second convergent lenses 959, the light emitters 70, and the light receivers 80 are the same. The first convergent lenses 919, the second convergent lenses 959, the light emitters 70, and the light receivers 80 are optically aligned with each other one to one.

The operating principle of the photoelectric conversion device 600 is substantially the same as the operating principle of the photoelectric conversion device 100.

In other embodiments, the main body can be made of resin having a different refractive index, and the predetermined ratio between the first and second light beam portions can be different. Additionally, numbers of the light emitters, light receivers, first convergent lenses, and second convergent lenses can be changed according to actual needs.

The above-described photoelectric conversion devices use the optical coupler to divide the light beam emitted from the light emitter into a first light beam portion and a second light beam portion according to a predetermined ratio. The first light beam portion is guided to an outside optical fiber, and the second light beam portion is guided to the light receiver. The light receiver can detect an intensity of the second light beam portion. In this way, the processor can calculate a total intensity of the light beam emitted from the light emitter according to the intensity of the second light beam portion.

Although numerous characteristics and advantages of the present embodiments have been set forth in the foregoing description, together with details of the structures and functions of the embodiments, the disclosure is illustrative only, and changes may be made in detail, including in the matters of shape, size, and the arrangement of parts within the principles of the disclosure to the full extent indicated by the broad general meaning of the terms in which the appended claims are expressed.

What is claimed is:

1. An optical coupler comprising:
    a main body, the main body being substantially cuboid in shape with a top surface, a bottom surface substantially parallel to the top surface, and a front surface substantially perpendicular to the top and bottom surfaces;
    a first convergent lens;
    a second convergent lens;
    wherein, the main body defining a bottom groove in the bottom surface, the bottom groove comprising:
    a first surface being inclined relative to the bottom surface;
    a second surface being substantially parallel to the bottom surface, the first surface and the second surface being located on a bottom portion of the bottom groove, the first convergent lens is positioned on the second surface;
    wherein, the main body defining a top groove in the top surface, the top groove having a third surface and a fourth surface closest to the bottom surface, the third surface and the fourth surface being inclined relative to the bottom surface;
    wherein, the second convergent lens is positioned on the front surface; and
    wherein, the top and bottom grooves are formed, the first and second convergent lens are positioned, so that when an incident light beam is received at the first surface at a predetermined incident angle, the light beam is divided into a first light beam portion and a second light beam portion according to a predetermined ratio, the first light beam portion being reflected to the second convergent lens and the second light beam portion being refracted and projected onto the third surface, the third surface then reflecting the second light beam portion onto the fourth surface so that the second light beam portion is reflected to the first convergent lens.

2. The optical coupler of claim 1, wherein the top groove further comprises a connecting surface, a third sidewall and a fourth sidewall, the connecting surface is connected between the third surface and the fourth surface, the third sidewall is connected between the third surface and the top surface, the fourth sidewall is connected between the fourth surface and the top surface.

3. A photoelectric conversion device, comprising:
an optical coupler comprising:
a main body, the main body being substantially cuboid in shape with a top surface, a bottom surface substantially parallel to the top surface, and a front surface substantially perpendicular to the top and bottom surfaces;
a first convergent lens;
a second convergent lens;
wherein, the main body defining a bottom groove in the bottom surface, the bottom groove comprising:
a first surface being inclined relative to the bottom surface;
a second surface being substantially parallel to the bottom surface, the first surface and the second surface being located on a bottom portion of the bottom groove, the first convergent lens is positioned on the second surface;
wherein, the main body defining a top groove in the top surface, the top groove having a third surface and a fourth surface closest to the bottom surface, the third surface and the fourth surface being inclined relative to the bottom surface;
wherein, the second convergent lens is positioned on the front surface; and
wherein, the top and bottom grooves are formed, the first and second convergent lens are positioned, so that when an incident light beam is received at the first surface at a predetermined incident angle, the light beam is divided into a first light beam portion and a second light beam portion according to a predetermined ratio, the first light beam portion being reflected to the second convergent lens and the second light beam portion being refracted and projected onto the third surface, the third surface then reflecting the second light beam portion onto the fourth surface so that the second light beam portion is reflected to the first convergent lens;
a light emitter;
a light receiver;
a processor; and
a circuit board;
wherein the light emitter, the light receiver, and the processor being electrically connected to the circuit board, the optical coupler being positioned on the circuit board, the light emitter and the light receiver being received in the bottom groove, the light emitter being configured to emit light beam toward the first surface, the light receiver being optically aligned with the first convergent lens, the light receiver being configured to receive light beam transmitted from the first convergent lens and detect an intensity of the received light beam, the processor being configured to calculate a total intensity of the light beam emitted from the light emitter according to the predetermined ratio between the first light beam portion reflected by the first surface and the second light beam portion refracted by the first surface.

4. The photoelectric conversion device of claim 3, wherein the top groove further comprises a connecting surface, a third sidewall and a fourth sidewall, the connecting surface is connected between the third surface and the fourth surface, the third sidewall is connected between the third surface and the top surface, the fourth sidewall is connected between the fourth surface and the top surface.

5. An optical coupler comprising:
a main body, the main body being substantially cuboid in shape with a top surface, a bottom surface substantially parallel to the top surface, and a front surface substantially perpendicular to the top and bottom surfaces;
a number of first convergent lenses;
a number of second convergent lenses;
wherein, the main body defining a bottom groove in the bottom surface, the bottom groove comprising:
a first surface being inclined relative to the bottom surface;
a second surface being substantially parallel to the bottom surface, the first surface and the second surface being located on a bottom portion of the bottom groove, the first convergent lenses are positioned on the second surface;
wherein, the main body defining a top groove in the top surface, the top groove having a third surface and a fourth surface closest to the bottom surface, the third surface and the fourth surface being inclined relative to the bottom surface;
wherein, the second convergent lenses are positioned on the front surface; and
wherein, the top and bottom grooves are formed, the first and second convergent lenses are positioned, so that when an incident light beam is received at the first surface at a predetermined incident angle, the light beam is divided into a first light beam portion and a second light beam portion according to a predetermined ratio, the first light beam portion being reflected to the second convergent lens and the second light beam portion being refracted and projected onto the third surface, the third surface then reflecting the second light beam portion onto the fourth surface so that the second light beam portion is reflected to the first convergent lens.

6. The optical coupler of claim 5, wherein the top groove further comprises a connecting surface, a third sidewall and a fourth sidewall, the connecting surface is connected between the third surface and the fourth surface, the third sidewall is connected between the third surface and the top surface, the fourth sidewall is connected between the fourth surface and the top surface.

7. The optical coupler of claim 2, wherein the main body is made of polyether imide resin having a refractive index of 1.663.

8. The optical coupler of claim 7, wherein the first surface is connected to the second surface at a 135 degree angle, the fourth surface is inclined for 45 degrees relative to the bottom surface, the third surface is inclined for $[22.5+(\arcsin 0.425)/2]$ degrees relative to the bottom surface.

9. The optical coupler of claim 8, wherein the incident angle between the incident light beam and the first surface is 45 degrees.

10. The optical coupler of claim 2, wherein the bottom groove further comprises a first sidewall and a second sidewall, the first sidewall and the second sidewall are connected substantially perpendicular to the bottom surface, the first surface is connected to the first sidewall at a 45 degree angle, the second surface is connected substantially perpendicular to the second sidewall.

11. The photoelectric conversion device of claim 4, wherein the main body is made of polyether imide resin having a refractive index of 1.663.

12. The photoelectric conversion device of claim 11, wherein the first surface is connected to the second surface at a 135 degree angle, the fourth surface is inclined for 45 degrees relative to the bottom surface, the third surface is inclined for $[22.5+(\arcsin 0.425)/2]$ degrees relative to the bottom surface.

13. The photoelectric conversion device of claim 12, wherein the incident angle between the incident light beam and the first surface is 45 degrees.

14. The photoelectric conversion device of claim 4, wherein the bottom groove further comprises a first sidewall and a second sidewall, the first sidewall and the second sidewall are connected substantially perpendicular to the bottom surface, the first surface is connected to the first sidewall at a 45 degree angle, the second surface is connected substantially perpendicular to the second sidewall.

15. The optical coupler of claim 6, wherein the main body is made of polyether imide resin having a refractive index of 1.663.

16. The optical coupler of claim 15, wherein the first surface is connected to the second surface at a 135 degree angle, the fourth surface is inclined for 45 degrees relative to the bottom surface, the third surface is inclined for [22.5+(arcsin0.425)/2] degrees relative to the bottom surface.

17. The optical coupler of claim 16, wherein the incident angle between the incident light beam and the first surface is 45 degrees.

18. The optical coupler of claim 6, wherein the bottom groove further comprises a first sidewall and a second sidewall, the first sidewall and the second sidewall are connected substantially perpendicular to the bottom surface, the first surface is connected to the first sidewall at a 45 degree angle, the second surface is connected substantially perpendicular to the second sidewall.

* * * * *